United States Patent
Kim et al.

(10) Patent No.: US 7,958,423 B2
(45) Date of Patent: Jun. 7, 2011

(54) METHOD AND APPARATUS FOR PERFORMING HYBRID AUTOMATIC RETRANSMISSION REQUEST (HARQ) IN A MOBILE COMMUNICATION SYSTEM

(75) Inventors: Soeng-Hun Kim, Suwon-si (KR); Sung-Ho Choi, Suwon-si (KR); Himke Van Der Velde, Middlesex (GB); Gert Jan Van Lieshout, Middlesex (GB)

(73) Assignee: Samsung Electronics Co., Ltd. (KR)

( * ) Notice: Subject to any disclaimer, the term of this patent is extended or adjusted under 35 U.S.C. 154(b) by 1037 days.

(21) Appl. No.: 11/732,288

(22) Filed: Apr. 3, 2007

(65) Prior Publication Data

US 2008/0022178 A1    Jan. 24, 2008

(30) Foreign Application Priority Data

Apr. 4, 2006  (KR) .................... 10-2006-0030749
Apr. 10, 2006 (KR) .................... 10-2006-0032510

(51) Int. Cl.
*H04L 1/18* (2006.01)
*G08C 25/02* (2006.01)
(52) U.S. Cl. ............... 714/748; 714/750; 714/E11.141; 370/474
(58) Field of Classification Search ......... 714/E11.141, 714/748–751; 370/474
See application file for complete search history.

(56) References Cited

U.S. PATENT DOCUMENTS

| 6,516,435 | B1 * | 2/2003 | Tsunoda ............ 714/751 |
| 6,760,860 | B1 | 7/2004 | Fong et al. |
| 7,185,256 | B2 * | 2/2007 | Miki et al. .......... 714/751 |
| 2003/0007480 | A1 | 1/2003 | Kim et al. |
| 2005/0022098 | A1 | 1/2005 | Vayanos et al. |
| 2005/0249120 | A1 * | 11/2005 | Heo et al. ........... 370/236 |
| 2007/0061664 | A1 * | 3/2007 | Pan et al. ........... 714/748 |
| 2007/0168821 | A1 * | 7/2007 | Nguyen ............. 714/748 |
| 2007/0280193 | A1 * | 12/2007 | Kim et al. ........... 370/349 |

FOREIGN PATENT DOCUMENTS

| EP | 1 557 967 | 7/2005 |
| KR | 1020020095125 | 12/2002 |
| KR | 1020040058434 | 7/2004 |
| WO | WO 2006/024321 | 3/2006 |

\* cited by examiner

*Primary Examiner* — Guy J Lamarre
(74) *Attorney, Agent, or Firm* — The Farrell Law Firm, P.C.

(57) ABSTRACT

A method and apparatus for performing Automatic Retransmission reQuest (ARQ) on packet data in a mobile communication system. The method includes receiving from a transmission entity performing ARQ, by a reception entity, a status report message including a Non-Acknowledged (NACK) signal for the packet data transmitted to the reception entity, and generating time information of the NACK signal; comparing, by the transmission entity, the generation time information with transmission complete time information for the packet data; and determining whether to retransmit the packet data depending on the comparison result, and performing retransmission of the packet data according to the determination step.

10 Claims, 13 Drawing Sheets

METHOD AND APPARATUS FOR PERFORMING HYBRID AUTOMATIC RETRANSMISSION REQUEST (HARQ) IN A MOBILE COMMUNICATION SYSTEM

PRIORITY

This application claims priority under 35 U.S.C.§119(a) to Korean Patent Applications filed in the Korean Intellectual Property Office on Apr. 4, 2006 and on Apr. 10, 2006, entitled "Method and Apparatus for Performing Hybrid Automatic Retransmission reQuest (HARQ) in a Mobile Communication System" respectively assigned Serial No. 2006-30749 and 2006-32510, the disclosure of which is incorporated herein by reference.

BACKGROUND OF THE INVENTION

1. Field of the Invention

The present invention relates generally to a mobile communication system, and in particular, to a transmission apparatus and method for scheduling retransmission in the next generation mobile communication system having both Automatic Retransmission reQuest (ARQ) and Hybrid Automatic Retransmission reQuest (HARQ).

2. Description of the Related Art

A Universal Mobile Telecommunication Service (UMTS) system is a 3$^{rd}$ generation asynchronous mobile communication system that is based on Global System for Mobile Communications (GSM) and General Packet Radio Services (GPRS), both being European mobile communication systems, and uses Wideband Code Division Multiple Access (CDMA).

The 3$^{rd}$ Generation Partnership Project (3GPP) is the entity in charge of UMTS standardization. It is now reviewing Long Term Evolution (LTE) as the next generation mobile communication system of the UMTS system. LTE, aimed at deployment in about 2010, is considered state of the art for implementing 100 Mbps high-speed packet based communication. To this end, several schemes are under discussion, those schemes include a scheme for reducing the number of nodes located in a communication path by simplifying the network configuration, and a scheme for maximally approximating wireless protocols to wireless channels. As a result, it is expected that the LTE configuration will change from the existing 4-node configuration to a 2-node or 3-node configuration.

FIG. 1 illustrates the configuration of an Evolved UMTS mobile communication system to which the present invention is applicable.

Referring to FIG. 1, as illustrated, Evolved Radio Access Networks (E-RANs) 110 and 112 are simplified to a 2-node configuration of Evolved Node Bs (ENBs or Node Bs) 120, 122, 124, 126 and 128, and Evolved Gateway GPRS Serving Nodes (EGGSNs) 130 and 132. A User Equipment (UE) 101 accesses an Internet Protocol (IP) network 114 by E-RANs 110 and 112.

ENBs 120 to 128, nodes corresponding to the existing Node Bs, are connected to UE 101 over a wireless channel, and performs a complex function, unlike the existing Node Bs.

In LTE, all user traffics including real-time services such as Voice over IP (VoIP) are serviced over a shared channel. This means that there is a need for an apparatus of collecting status information of UEs and performing scheduling depending thereon, and the scheduling is managed by ENB 120 to 128. For convenience, the terms 'ENB' and 'Node B' will herein be used interchangeably.

Like High Speed Downlink Packet Access (HSDPA) or Enhanced Dedicated Channel (EDCH), LTE also performs Hybrid Automatic Retransmission Request (HARQ) between ENB and UE. However, with use of only HARQ, LTE cannot meet various Quality of Service (QoS) requirements. Therefore, outer-ARQ is performed even between UE 101 and ENBs 120 to 128. The outer-ARQ means a normal ARQ being performed in RLC layer.

It is expected that LTE will use Orthogonal Frequency Division Multiplexing (OFDM) as wireless access technology in a 20-Mhz bandwidth in order to realize the maximum data rate of 100 Mbps. In addition, Adaptive Modulation & Coding (AMC) scheme determining the modulation scheme and the channel coding rate according to the channel status of the terminal will be applied to LTE.

Many mobile communication systems now under discussion, including LTE, use both HARQ and ARQ as error correction technique. HARQ refers to a technique of soft-combining previously received data with retransmitted data, without discarding the previously received data, thereby increasing a reception rate. More specifically, an HARQ receiver checks presence/absence of an error in a received packet, and then sends an HARQ Acknowledged (ACK) signal or an HARQ Non-Acknowledged (NACK) signal to a transmitter according to the error check result. The transmitter then performs retransmission of the HARQ packet or transmission of a new HARQ packet according to the HARQ ACK/NACK signal. That is, the HARQ technique soft-combines the retransmitted packet with the previously received packet, thereby reducing an error rate.

However, ARQ refers to a technique of checking a sequence number of a received packet and sending a retransmission request for a failed packet (or a missing packet), if any, and the ARQ technique does not soft-combine the previously received packet with the retransmitted packet.

It is argued that since both ARQ and HARQ perform the function of recovering failed packets, there is no need to use them together. However, because it is hard to obtain a sufficiently low packet error ratio only with HARQ, ARQ and HARQ should both be used for most packet services. This is because HARQ can hardly reduce the error rate through channel coding, as the HARQ ACK/NACK signal is a 1-bit response signal. That is, if an HARQ NACK signal is misrecognized as an HARQ ACK signal, the corresponding packet is completely lost at the HARQ level. Therefore, reliability of the HARQ ACK/NACK signal serves as an important factor for determining the packet error ratio in the HARQ level. Thus, in the mobile communication systems using both HARQ and ARQ, with use of HARQ transmission information, an ARQ transmitter can perform fast retransmission. However, in the current mobile communication systems, there is no discussion on a detailed method in which the ARQ transmitter performs retransmission using the HARQ transmission information. Therefore, there is a need for a detailed method for preventing the ARQ transmitter from performing unnecessary retransmission.

SUMMARY OF THE INVENTION

An aspect of the present invention is to address at least the above problems and/or disadvantages and to provide at least the advantages described below. Accordingly, an aspect of the present invention is to provide an ARQ transmission apparatus and method for efficiently scheduling ARQ retransmission using ARQ transmission information in a mobile communication system.

Another aspect of the present invention is to provide an apparatus and method for performing scheduling so as to prevent an ARQ transmitter from performing unnecessary retransmission in a next generation mobile communication system implementing both HARQ and ARQ.

According to one aspect of the present invention, there is provided a method for performing Automatic Retransmission reQuest (ARQ) on packet data in a mobile communication system. The method includes receiving from a reception entity, by a transmission entity performing ARQ, a status report message including a Non-Acknowledged (NACK) signal for the packet data transmitted to the reception entity, and generation time information of the NACK signal; comparing, by the transmission entity, the generation time information with transmission complete time information for the packet data; and determining whether to perform retransmission on the packet data depending on the comparison result, and performing retransmission on the packet data according to the determination.

According to another aspect of the present invention, there is provided an apparatus for performing Automatic Retransmission reQuest (ARQ) on packet data in a mobile communication system. The apparatus includes a transmission buffer for storing packet data generated in an upper layer; a framing unit for framing the transmission packet data in an appropriate size and inserting a header therein; a retransmission buffer for temporarily storing the packet data delivered from the framing unit; a Hybrid Automatic Retransmission reQuest (HARQ) device for reconfiguring and transmitting the framed packet data in an HARQ unit, and soft-combining an HARQ response signal transmitted from a receiver with a response signal for transmission-completed HARQ packet data to generate a Non-Acknowledged (NACK) signal for requesting retransmission of the packets; and a controller for controlling the retransmission buffer and the transmission buffer taking into account the NACK signal delivered from the HARQ device and the HARQ response signal received from the receiver. The controller compares a generation time of the NACK signal for the packet data with a transmission complete time for the packet data, and determines whether to perform retransmission on the packet data according to the comparison result.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Exemplary embodiments of the present invention will now be described in detail with reference to the annexed drawings. In the following description, detailed description of known functions and configurations incorporated herein has been omitted for clarity and conciseness.

The present invention provides a method and apparatus in which an ARQ transmitter performs fast retransmission using HARQ transmission information to prevent unnecessary retransmission in a system in which HARQ and ARQ operate together. The present invention can be applied to all mobile communication systems employing HARQ and ARQ.

Figure 1:
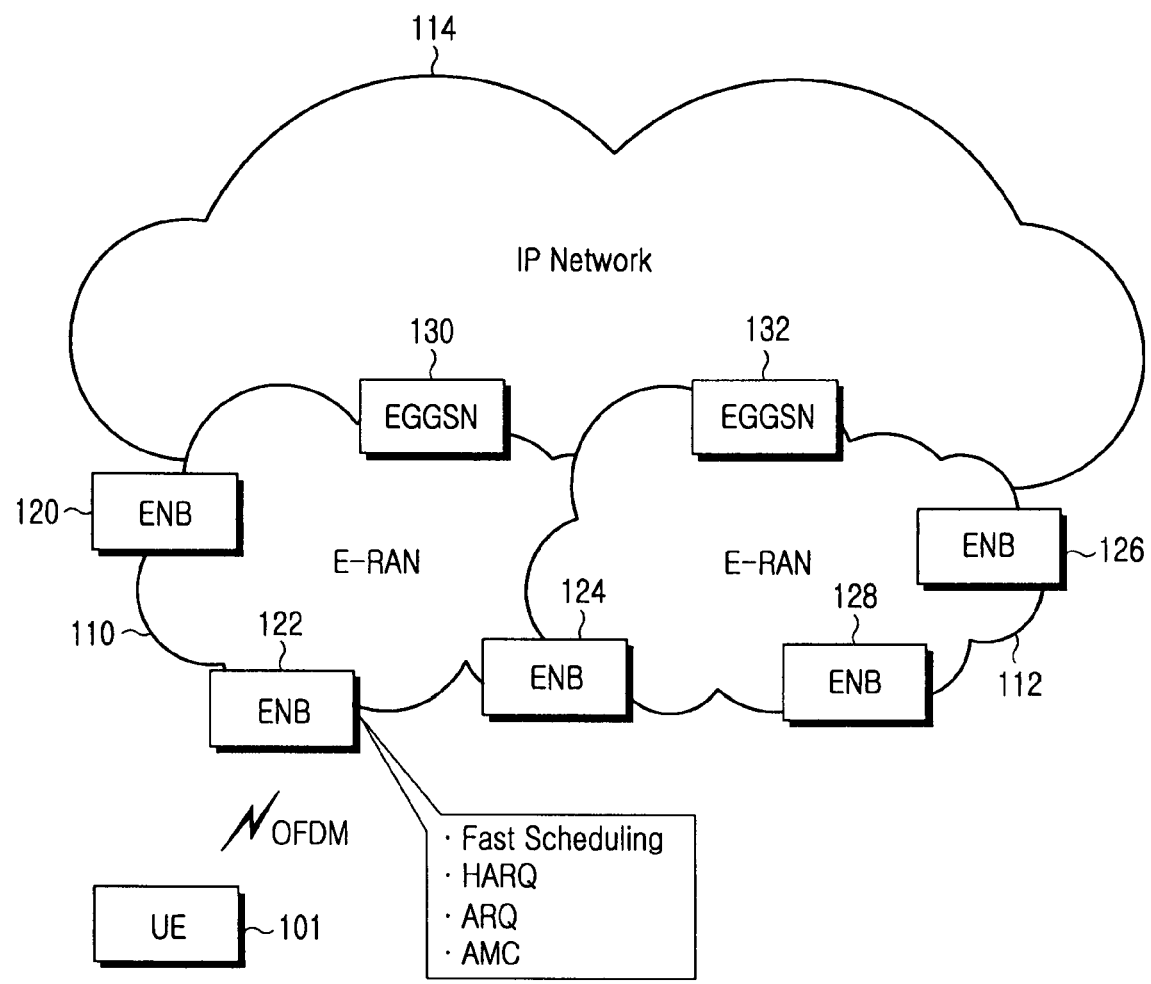
FIG. 1 is a diagram illustrating the configuration of an Evolved UMTS mobile communication system to which the present invention is applicable.
Figure 2:
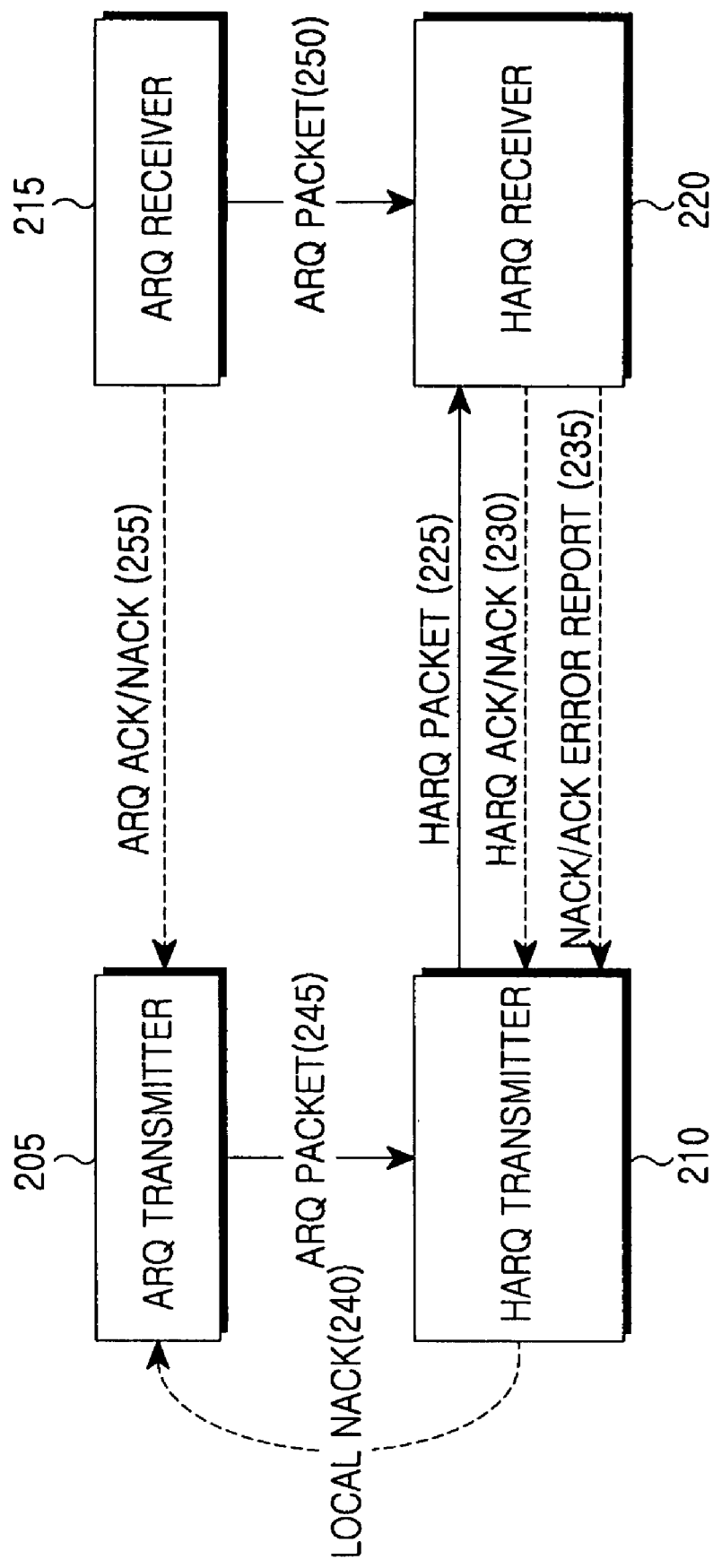
FIG. 2 is a diagram illustrating the configuration of a system that performs HARQ and ARQ simultaneously according to the present invention.

Referring to FIG. 2, an ARQ transmitter 205 delivers an ARQ packet (245) to an HARQ transmitter 210. The ARQ packet, a basic packet in an ARQ operation, has a payload to which user data of an upper layer is mapped, and a header in which a sequence number is inserted.

HARQ transmitter 210 transmits a packet (225) to an HARQ receiver 220 using a specific HARQ operation. For convenience, the packet transmitted through the HARQ operation will be referred to 'HARQ packet'. HARQ transmitter 210 can map one ARQ packet to one HARQ packet, or can map several ARQ packets to one HARQ packet.

Upon receiving the HARQ packet, HARQ receiver 220 checks presence/absence of an error in the packet, and sends an HARQ NACK (230) as a response signal in the presence of error, and sends an HARQ ACK (not shown) in the absence of error.

Upon receipt of the HARQ NACK from HARQ receiver 220, HARQ transmitter 210 retransmits the corresponding HARQ packet, and upon receipt of the HARQ ACK, HARQ transmitter 210 discards the corresponding HARQ packet and transmits a new HARQ packet.

In some cases, HARQ transmitter 210 may abandon transmission of the HARQ packet. For example, HARQ transmitter 210 may not transmit the HARQ packet when the number of transmissions of the HARQ packet has reached a predetermined maximum number of transmissions, or when a predetermined transmission delay time has elapsed. In this case, HARQ transmitter 210 starts transmission of a new HARQ packet at the next transmission time, considering there was a failure in the HARQ packet transmission.

When HARQ transmitter 210 abandons transmission of an average HARQ packet in this way, HARQ transmitter 210 sends to ARQ transmitter 205 a retransmission request (240)

for the ARQ packets contained in the corresponding HARQ packet. This retransmission request is referred to herein as a 'local NACK'.

The HARQ ACK/NACK signal can be misinterpreted at a receiver due to an error occurring during transmission. In particular, when an HARQ NACK signal is misrecognized as an HARQ ACK signal in HARQ transmitter 210, HARQ transmitter 210 stops the retransmission for the HARQ packet, considering that the corresponding HARQ packet has been successfully transmitted. If HARQ receiver 220 later recognizes that the previously sent HARQ NACK signal was misconceived as an HARQ ACK signal, HARQ receiver 220 can send a NACK/ACK error report (235) to HARQ transmitter 210.

In this case also, HARQ transmitter 210 sends to ARQ transmitter 205 a retransmission request (240) for the ARQ packets corresponding to the HARQ packet for which the NACK/ACK error report was received. The retransmission request for the error-reported ARQ packets, sent from HARQ transmitter 210 to ARQ transmitter 205, is also referred to as a 'local NACK'.

In other words, HARQ transmitter 210 sends a local NACK for the ARQ packets contained in the transmission-abandoned HARQ packet, or for the ARQ packets contained in the NACK/ACK-faulty HARQ packet, thereby sending an ARQ retransmission request (240) to the ARQ transmitter 205.

The unsent ARQ packets, or the corresponding NACK/ACK-faulty ARQ packets will be recognized later as missing packets by an ARQ receiver 215, and ARQ receiver 215 will send to ARQ transmitter 205 a retransmission request in an ARQ level for the packets recognized as missing packets (255).

In the system where ARQ retransmission is performed in association with a transmission state of HARQ transmitter 210 in this manner, a retransmission request may be repeated for the same ARQ packet. In addition, the retransmission of the ARQ packet for every retransmission request results in repeated retransmission of the ARQ packet.

Therefore, ARQ transmitter 205 needs to prevent unnecessary packet retransmission by monitoring reception of the local NACK sent from HARQ transmitter 210 and the ARQ ACK/NACK sent from ARQ receiver 215.

For convenience, a retransmission request for a particular ARQ packet, sent by HARQ transmitter 210, will be referred to herein as a local NACK for the corresponding ARQ packet. Further, a retransmission request for a particular ARQ packet, sent by ARQ receiver 215, will be referred to as an ARQ NACK for the corresponding ARQ packet.

In the mobile communication system where HARQ and ARQ operate together and an HARQ transmitter generates a local NACK, generation of a local NACK and an ARQ NACK may be repeated for one ARQ packet in the following cases.

The local NACK is sent to an ARQ transmitter at the time the HARQ transmitter detects an HARQ transmission failure, or at the time the HARQ transmitter receives a NACK/ACK error report. However, the ARQ NACK occurs at the time an ARQ receiver recognizes any gap between sequence numbers of received packets.

However, when the ARQ receiver detects a missing packet based on the sequence number, the scheme cannot recognize occurrence of the missing packet until the succeeding packet to the missing packet is received. For example, when a packet with sequence number=3 is lost during transmission, the ARQ receiver cannot find the loss packet with sequence number=3 until it receives a packet with sequence number=4.

Therefore, when one ARQ packet is missing, a local NACK for the corresponding packet is sent to the ARQ transmitter, ahead of the ARQ NACK.

In addition, the local NACK and the ARQ NACK are different from each other in terms of the possible case where the NACKs may occur.

Generally, the loss of the ARQ packet can occur due to the following three reasons A1 to A3, and the ARQ NACK occurs in all of the following cases.

A1. Transmission failure of an ARQ packet occurs due to transmission abandonment of an HARQ transmitter.

A2. Transmission of an ARQ packet has failed because the HARQ transmitter misinterprets an HARQ NACK as an HARQ ACK.

A3. Transmission has failed due to other unknown reasons.

When the ARQ packet loss is due to the first reason A1 and the second reason A2 among the reasons why missing an ARQ packet occurs, the local NACK also occurs together with the ARQ NACK. However, when the ARQ packet loss occurs due to the third reason A3, the local NACK does not occur and only the ARQ NACK occurs.

For convenience, the ARQ packet loss in which the local NACK and the ARQ NACK occur together will be referred to as 'ARQ packet loss type #1' (or type-#1 ARQ packet loss), and the ARQ packet loss in which only the ARQ NACK occurs will be referred to as 'ARQ packet loss type #2' (or type-#2 ARQ packet loss). In addition, the period required until one ARQ packet transmitted from the ARQ transmitter is successfully received at the ARQ receiver will be referred to as an 'ARQ cycle'.

From the foregoing details, the following facts can be inferred.

B1. If all ARQ packet losses occurring for one ARQ cycle are the ARQ packet loss type #1, the number of local NACKs is equal to the number of ARQ NACKs.

B2. If the ARQ packet losses occurring for one ARQ cycle include any ARQ packet loss occurring due to the ARQ packet loss type #2, the number of ARQ NACKs is greater than the number of local NACKs.

B3. If the ARQ NACK information is lost during transmission, the relationship between the number of local NACKs and the number of ARQ NACKs is subject to change.

B4. If both the local NACK and the ARQ NACK occur for one ARQ packet loss, it is always that the local NACK is generated ahead of the ARQ NACK and then sent to the ARQ transmitter.

For a better understanding of the present invention, a relationship between the local NACK and the ARQ NACK will now be described with reference to FIGS. 3A and 3B. It is assumed in FIGS. 3A and 3B that transmission of an average ARQ packet is successfully made after 3 failures. For reference, packet transmission success/failure means the transmission success/failure at the ARQ level rather than the transmission success/failure at the HARQ level.

Figure 3A:
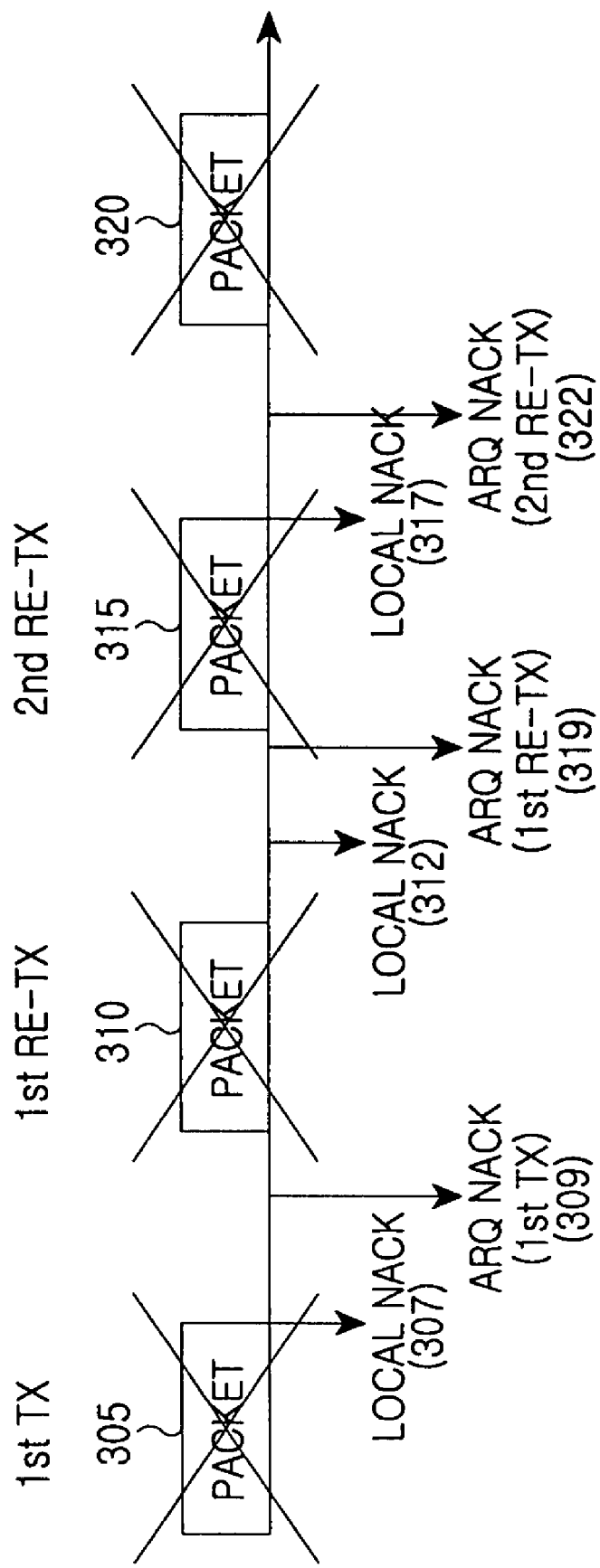
FIGS. 3A and 3B are diagrams illustrating the relationship between a local NACK and an ARQ NACK according to the present invention.
Figure 3B:
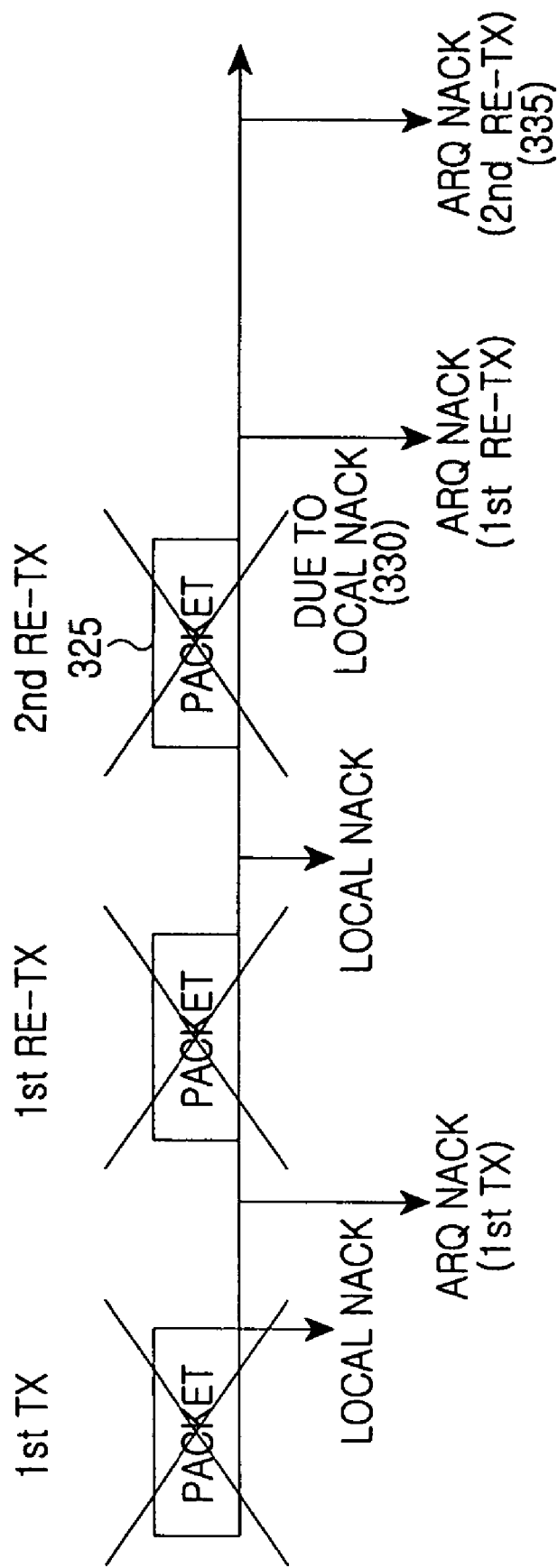

FIG. 3A is a diagram illustrating the case where all packet losses are the ARQ packet loss type #1, i.e. the local NACK and the ARQ NACK are equal in number, and FIG. 3B is a diagram illustrating the case where both the ARQ packet loss type #1 and the ARQ packet loss type #2 occur, i.e. the ARQ NACK is greater than the local NACK in number.

Referring to FIG. 3A, an ARQ transmitter performs first transmission for an arbitrary ARQ packet at a time 305. Here, the ARQ packet transmission has failed, and if the ARQ packet transmission failure is due to the ARQ packet loss type #1, an HARQ transmitter sends a local NACK (307) to the ARQ transmitter upon detecting the fact. After a lapse of a predetermined time, an ARQ receiver also detects the failure to receive the ARQ packet and sends an ARQ NACK (309) to the ARQ transmitter.

Thereafter, the ARQ transmitter performs first retransmission on the ARQ packet at a time 310, and the first-retransmitted packet is also assumed to be lost during transmission. If the loss of the first-retransmitted packet is also the ARQ packet loss type #1, the HARQ transmitter sends a local NACK (312) to the ARQ transmitter, and at an arbitrary time, the ARQ receiver also detects the packet loss and sends an ARQ NACK (319) to the ARQ transmitter.

In addition, the ARQ transmitter performs second retransmission for the ARQ packet at a time 315, and the second-retransmitted packet is also assumed to be lost during transmission. If the ARQ packet loss is the ARQ packet loss type #1, the HARQ transmitter, because it recognizes the loss of the ARQ packet, sends a local NACK (317) to the ARQ transmitter, and at an arbitrary time, the ARQ receiver also detects the packet loss and sends an ARQ NACK (322) to the ARQ transmitter. If all ARQ packet losses occurring in one ARQ cycle are the ARQ packet loss type #1 in this way, the ARQ NACKs and local NACKs transmitted to the ARQ transmitter are equal in number.

However, if the ARQ packet losses occurring in one ARQ cycle include any ARQ packet loss occurring due to reason B3 or reason B4, the number of ARQ NACKs is greater than the number of local NACKs.

Referring to FIG. 3B, it is assumed that the ARQ transmitter performs second retransmission on the ARQ packet that has failed in the first transmission and the first retransmission, at a time 325. If the loss of the second-retransmitted ARQ packet is the ARQ packet loss type #2, no local NACK (330) occurs because the HARQ transmitter cannot recognize the ARQ packet loss. Thereafter, the ARQ packet loss is recognized by the ARQ receiver, and the ARQ receiver sends an ARQ NACK (335). That is, in the example of FIG. 3B, the number of ARQ NACKs is greater by one than the number of local NACKs.

Referring to FIGS. 3A and 3B, the following facts can be inferred.

When an ARQ packet loss type #1 occurs, because the local NACK is sent to the ARQ transmitter ahead of the ARQ NACK, it is preferable for the ARQ transmitter to immediately perform retransmission upon receipt of the local NACK. In addition, for the ARQ packet loss type #1 and the corresponding ARQ NACK, there is no need to re-perform retransmission on the corresponding ARQ packet when the ARQ NACK is received because the retransmission has already been performed.

However, when an ARQ packet loss type #2 occurs, the HARQ transmitter generates only the ARQ NACK without generating the local NACK because it cannot detect the packet loss. Therefore, for the ARQ packet loss type #2 and the corresponding ARQ NACK, the HARQ transmitter should retransmit the packet.

Therefore, the ARQ transmitter should determine if the ARQ NACK corresponds to the ARQ packet loss type #1 or the ARQ packet loss type #2. In addition, as for the packet loss corresponding to the ARQ packet loss type #2, because the local NACK does not occur, if the number of ARQ NACKs for an average ARQ packet is greater than the number of local NACKs, the ARQ transmitter can determine that the ARQ packet loss corresponding to the ARQ packet loss type #2 has occurred.

Therefore, the present invention provides a method and apparatus, in which the ARQ transmitter rapidly performs retransmission and avoids unnecessary retransmission, using the correlation between the local NACK and the ARQ NACK. In the present invention, upon receipt of a local NACK, the ARQ transmitter always retransmits the corresponding ARQ packet. In addition, upon receipt of an ARQ NACK, the ARQ transmitter compares the number of ARQ NACKs received for the corresponding packet with the number of local NACKs received, and performs retransmission only when the number of received ARQ NACKs is greater.

First Embodiment

Figure 4:
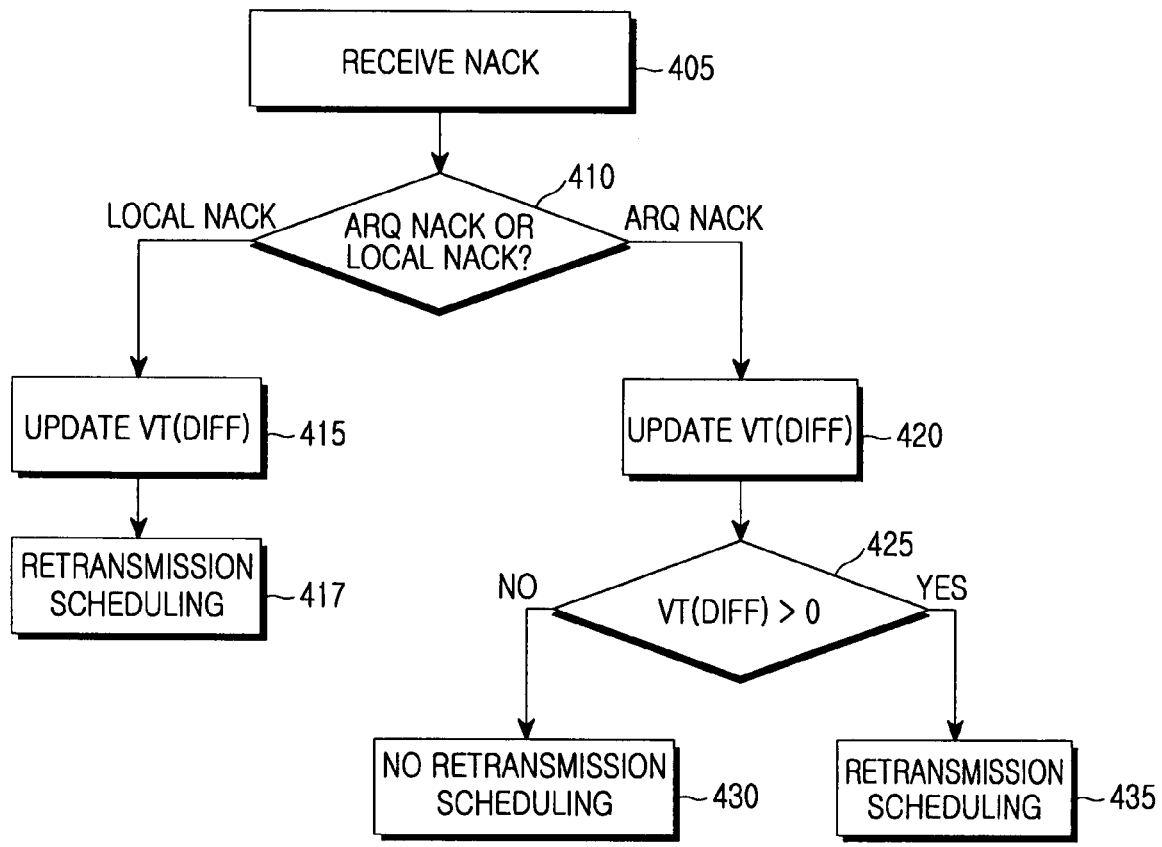
FIG. 4 is a diagram illustrating an ARQ transmitter's operation according to the present invention.

Referring to FIG. 4, an ARQ transmitter receives in step 405 a NACK for an average packet from an HARQ transmitter or an ARQ receiver. The ARQ transmitter determines in step 410 if the NACK is a local NACK or an ARQ NACK.

The local NACK and the ARQ NACK can be distinguished by one of the following two methods.

C1. If the entity that transmitted NACK information is the HARQ transmitter, the NACK information is a local NACK, and if the entity is the ARQ receiver, the NACK information is an ARQ NACK.

C2. The local NACK and the ARQ NACK can be distinguished because the local NACK and the ARQ NACK have different formats.

If the NACK received in step 405 is a local NACK, the ARQ transmitter updates a variable for managing an ARQ packet in step 415. VT (DIFF) is used as the variable. VT (DIFF) is a variable that is uniquely managed for each ARQ packet, and the difference between the number of ARQ NACKs for the corresponding ARQ packet and the number of local NACKs is stored as the variable. An initial value of VT (DIFF) is '0'. The ARQ transmitter decreases VT (DIFF) by 1 upon receipt of the local NACK, and increases VT (DIFF) by 1 upon receipt of the ARQ NACK.

In step 417, the ARQ transmitter schedules retransmission for the corresponding ARQ packet unless the following exceptional situations occur.

Exceptional Situations for No Retransmission of ARQ Packet

D1. Retransmission of the ARQ packet has already been scheduled.

D2. The ARQ packet is being processed in an HARQ processor.

However, if the NACK received in step 405 is an ARQ NACK, the ARQ transmitter increases VT (DIFF) by 1 in step 420. The ARQ transmitter determines in step 425 whether VT (DIFF) is greater than '0'. If VT (DIFF) is greater than '0', meaning that the number of local NACKs is greater than the number of ARQ NACKs, the ARQ transmitter schedules in step 435 retransmission for the corresponding ARQ packet. However, if VT (DIFF) is less than or equal to '0' in step 425, the ARQ transmitter schedules no retransmission for the corresponding ARQ packet in step 430, disregarding the ARQ NACK.

Second Embodiment

Although the first embodiment of the present invention does not classify the local NACKs sent to the ARQ transmitter by the HARQ transmitter, a second embodiment classifies the local NACKs into two types, and describes an ARQ transmitter's operation based thereon.

The local NACK occurs for the following two reasons.

E1. Transmission failure of an ARQ packet occurs due to transmission abandonment of the HARQ transmitter.

E2. Transmission of an ARQ packet is failed because the HARQ transmitter misinterprets an HARQ NACK as an HARQ ACK.

For convenience, the misinterpretation of the HARQ NACK as the HARQ ACK will be referred to herein as a 'NACK/ACK error'.

If an HARQ receiver detects the NACK/ACK error and sends an NACK/ACK error report to the HARQ transmitter because the HARQ transmitter cannot detect the NACK/ACK error, the HARQ transmitter can send a local NACK for the NACK/ACK error to the ARQ transmitter based on the NACK/ACK error report. If the HARQ receiver receives a new HARQ packet while expecting HARQ retransmission, it regards the receipt as occurrence of a NACK/ACK error. In other words, if the HARQ receiver, after sending an HARQ NACK for an arbitrary HARQ packet, receives a new packet rather than a retransmitted HARQ packet from the HARQ transmitter, the HARQ receiver considers that a NACK/ACK error has occurred.

In addition, even when the HARQ transmitter discontinues packet transmission, the HARQ receiver sends a NACK/ACK error report to the HARQ transmitter, considering that a NACK/ACK error has occurred. In this case, the local NACK occurs two times. A first local NACK occurs while the HARQ transmitter abandons HARQ transmission, and a second local NACK occurs while the HARQ transmitter receives a NACK/ACK error report from the HARQ receiver. The local NACK occurring while the HARQ transmitter discontinues the HARQ transmission will be referred to as a 'local NACK type #1' (or type-#1 local NACK), and the local NACK occurring while the HARQ transmitter receives a NACK/ACK error report from the HARQ receiver will be referred to as a 'local NACK type #2' (or type-#2 local NACK).

When transmission of an ARQ packet is failed because the HARQ transmitter discontinues transmission, local NACK type #1, local NACK type #2 and ARQ NACK occur in sequence. In addition, when transmission of an ARQ packet fails due to the NACK/ACK error, local NACK type #2 and ARQ NACK occur in sequence. When the transmission of an ARQ packet fails due to other reasons except for the transmission abandonment and the NACK/ACK error, only the ARQ NACK occurs.

Therefore, a preferable ARQ transmitter's operation can be defined as follows.

F1. The ARQ transmitter immediately performs retransmission for the local NACK type #1.

F2. For the local NACK type #2, the ARQ transmitter performs retransmission only when the number of 'local NACK type #2's is greater than the number of 'local NACK type #1's.

F3. For the ARQ NACK, the ARQ transmitter performs retransmission only when the number of ARQ NACKs is greater than the number of 'local NACK type #2's.

Figure 5:
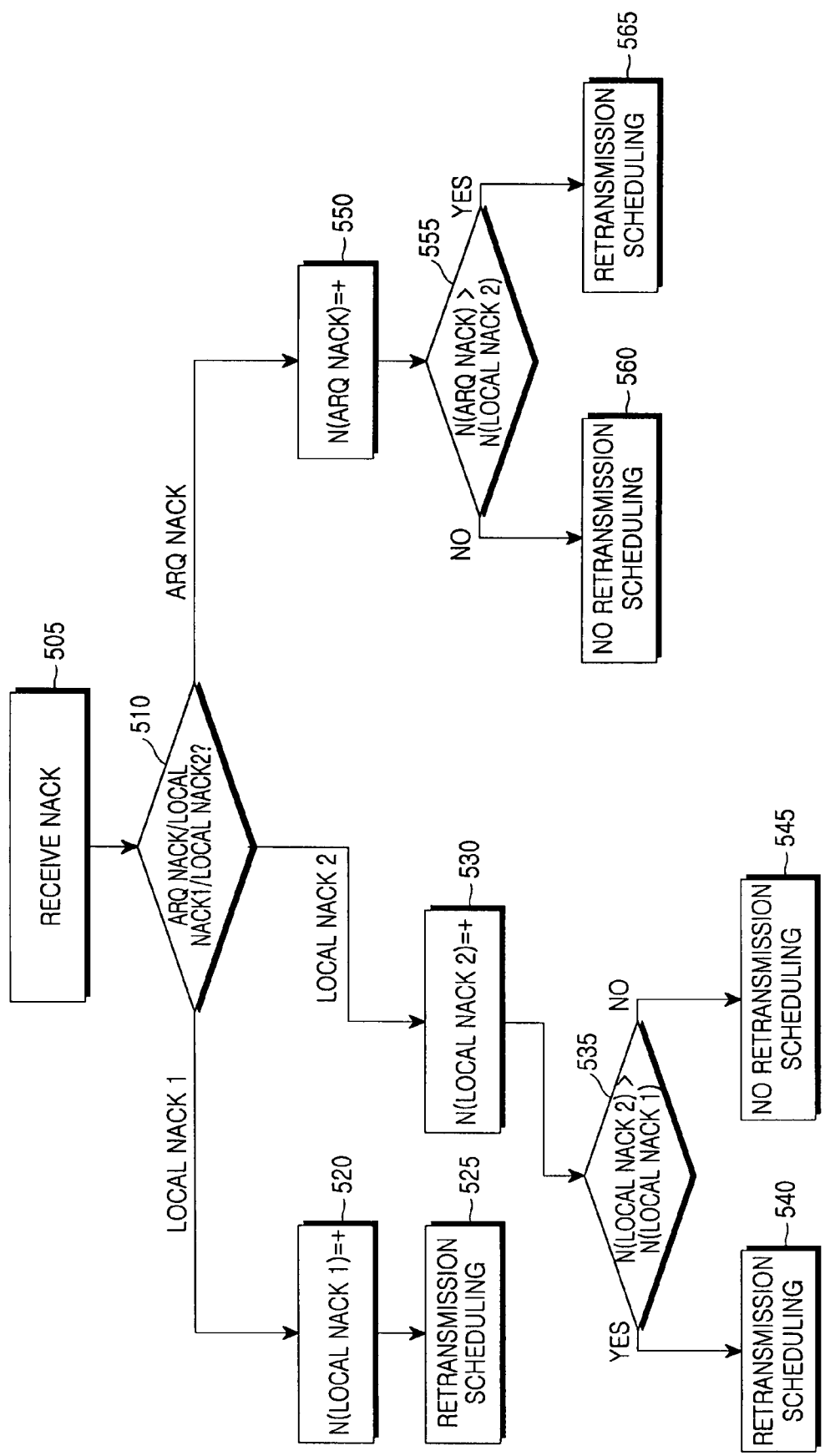
FIG. 5 is a flow chart of an ARQ transmitter's operation according to the present invention.

Referring to FIG. 5, an ARQ transmitter receives in step 505 a NACK for an average packet from an HARQ transmitter or an ARQ receiver. The ARQ transmitter determines in step 510 if the NACK is a local NACK type #1, a local NACK type #2, or an ARQ NACK. The ARQ transmitter proceeds to step 520 if the NACK is a local NACK type #1, proceeds to step 530 if the NACK is a local NACK type #2, and proceeds to step 550 if the NACK is an ARQ NACK.

The ARQ transmitter increases N (local NACK 1) by 1 in step 520, and schedules in step 525 retransmission for the corresponding ARQ packet in the case other than 'Exceptional Situations for No Retransmission of ARQ Packet'. N(local NACK 1) is a variable that is uniquely managed for each ARQ packet, and the number of 'local NACK type #1's received up to now for the corresponding ARQ packet is stored as the variable. The initial value of N (local NACK 1) is '0', and the ARQ transmitter increases N (local NACK 1) by 1 upon receipt of the local NACK type #1.

In step 530, the ARQ transmitter increases N (local NACK 2) by 1. N (local NACK 2) is a variable that is uniquely managed for each ARQ packet, and the number of 'local NACK type #2's received up to now for the corresponding ARQ packet is stored as the variable. An initial value of N (local NACK 2) is '0', and the ARQ transmitter increases N (local NACK 2) by 1 upon receipt of the local NACK type #2. In step 535, the ARQ transmitter compares N (local NACK 2) with N (local NACK 1). The ARQ transmitter proceeds to step 540 for N (local NACK 2)>N (local NACK 1), and proceeds to step 545 for N (local NACK 2)<N (local NACK 1). In step 540, the ARQ transmitter schedules retransmission for the corresponding ARQ packet in the case other than 'Exceptional Situations for No Retransmission of ARQ Packet'. However, in step 545, the ARQ transmitter schedules no retransmission for the corresponding ARQ packet, disregarding the local NACK type #2 received in step 505.

In step 550, the ARQ transmitter increases N (ARQ NACK) by 1. N (ARQ NACK) is a variable that is uniquely managed for each ARQ packet, and the number of ARQ Knacks for the corresponding ARQ packet is stored as the variable. An initial value of N (ARQ NACK) is '0', and the ARQ transmitter increases N (ARQ NACK) by 1 upon receipt of the ARQ NACK. In step 555, the ARQ transmitter compares N (ARQ NACK) and N (local NACK 2). The ARQ transmitter proceeds to step 565 for N (ARQ NACK)>N (local NACK 2), and proceeds to step 560 for N (ARQ NACK)<N (local NACK 2). In step 565, the ARQ transmitter schedules retransmission for the corresponding ARQ packet in the case other than 'Exceptional Situations for No Retransmission of ARQ Packet'. In step 560, the ARQ transmitter schedules no retransmission for the corresponding ARQ packet, disregarding the ARQ NACK received in step 505.

Third Embodiment

In a third embodiment of the present invention, an ARQ receiver transmits information on the time an ARQ NACK has occurred (hereinafter referred to as 'timestamp') along with ARQ NACK information, and an ARQ transmitter determines whether to perform retransmission depending on the timestamp.

Figure 6:
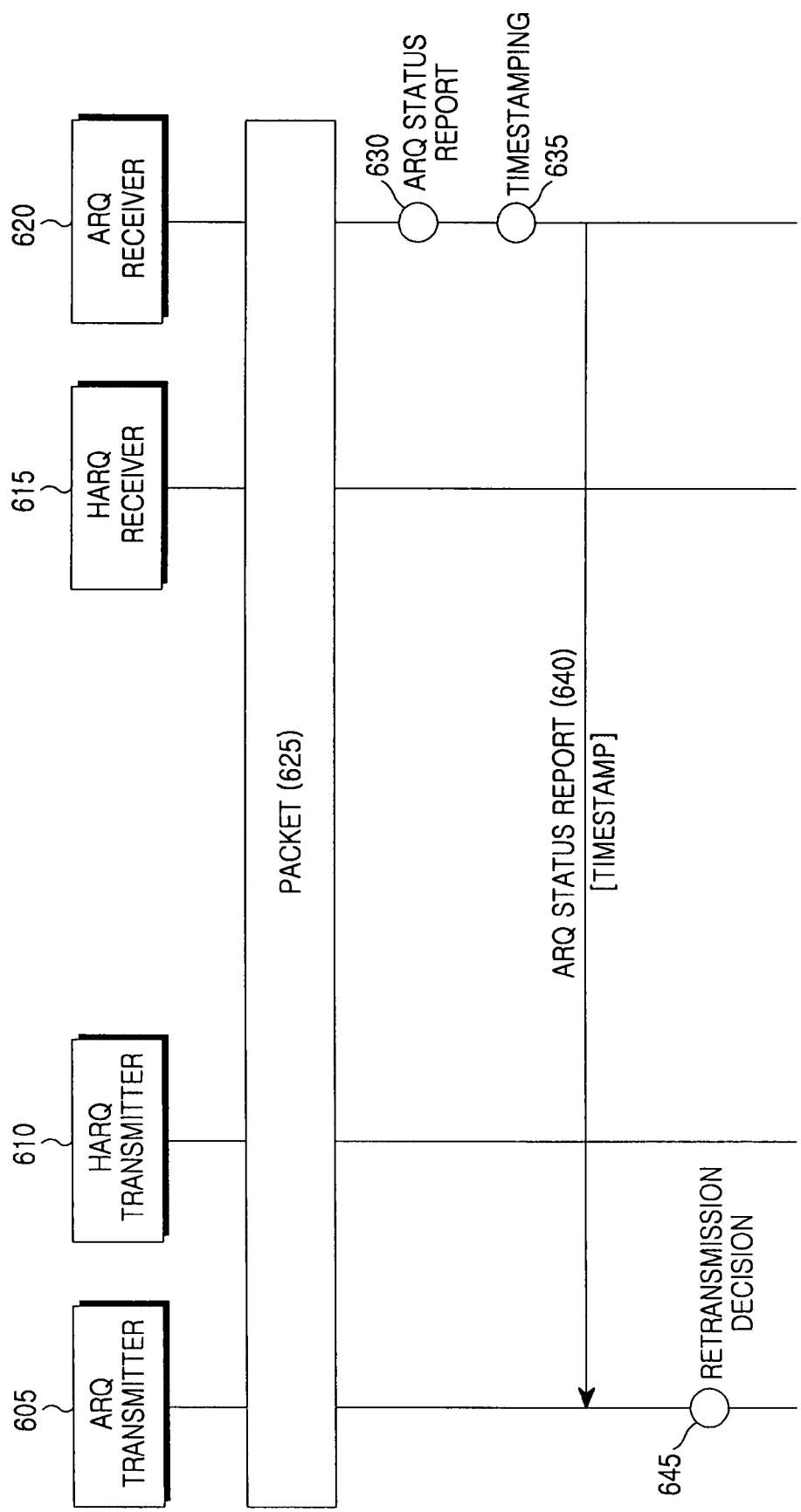
FIG. 6 is a flow diagram illustrating the overall system operation of performing ARQ transmission using a status report according to the present invention.

Referring to FIG. 6, an ARQ packet is exchanged between an ARQ transmitter 605 and an ARQ receiver 620 in step 625.

ARQ receiver 620 arbitrarily generates in step 630 an ARQ status report for the ARQ packet. The ARQ status report contains ARQ packet reception status information up to now. That is, the ARQ status report contains ACK information for the ARQ packets normally received at the time the ARQ status report has occurred, and NACK information for the failed ARQ packets at the time the ARQ status report was generated. In step 635, ARQ receiver 620 inserts in the ARQ status report even the timestamp indicating the time the ARQ status report was generated. In step 640, ARQ receiver 620 sends the timestamp-contained ARQ status report to ARQ transmitter 605.

Upon receipt of the ARQ status report, ARQ transmitter 605 determines in step 645 whether to perform retransmission of the packets for which an ARQ NACK was received, based on the time information contained in the ARQ status report. That is, ARQ transmitter 605 stores the information on the time that the retransmission of the retransmitted packets was completed, and if an ARQ NACK for an average ARQ packet is included in the ARQ status report, ARQ transmitter 605 retransmits the ARQ packet only when the timestamp value included in the ARQ status report indicates the time lagging behind the stored time that the retransmission of the corresponding ARQ packet was completed. when an arbitrary ARQ packet is retransmitted, an ARQ transmitter stores the information on the time the retransmission of the retransmitted ARQ packet is completed (hereafter referred to retransmission complete time).

Figure 7:
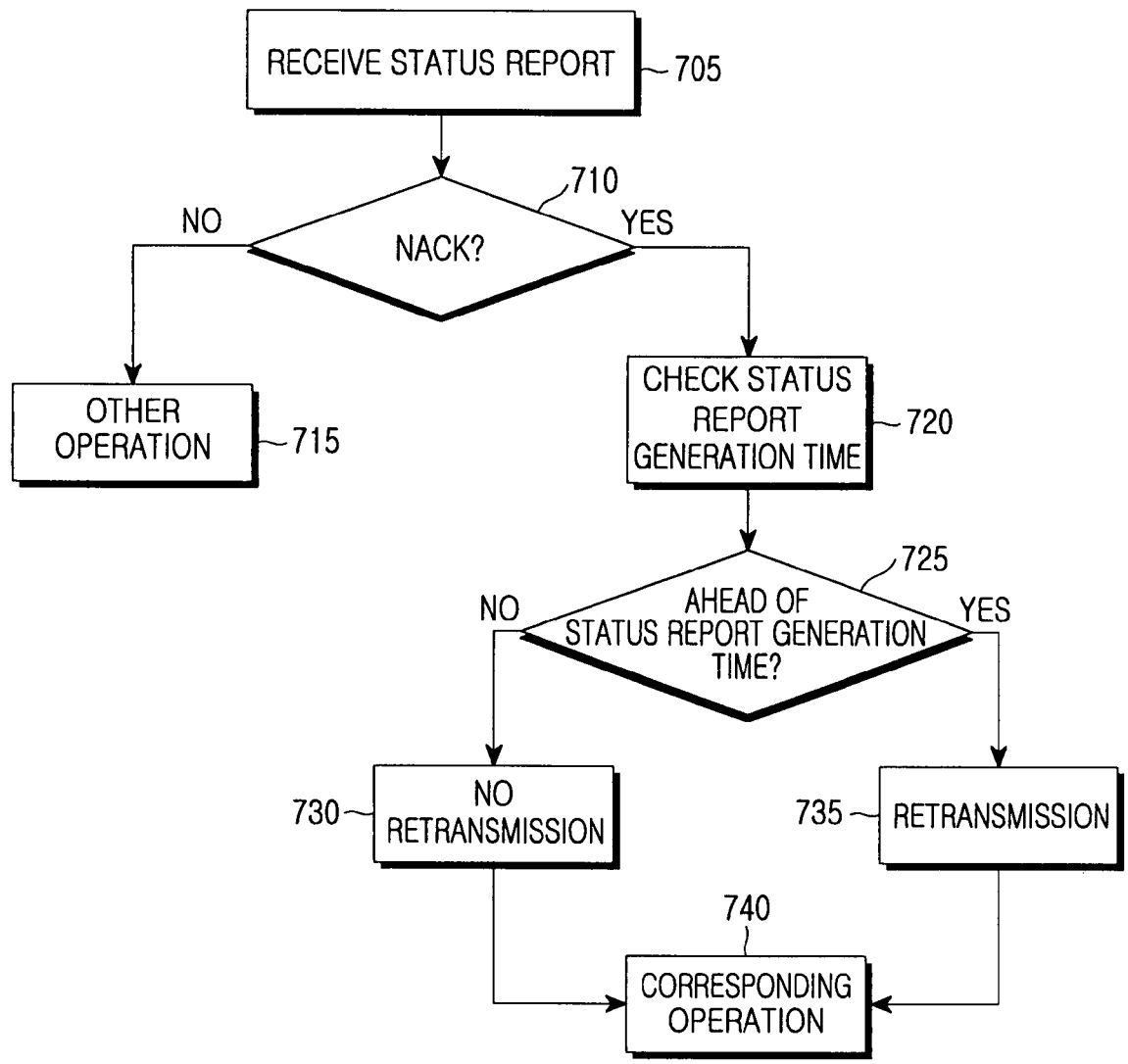
FIG. 7 is a flow chart illustrating an ARQ transmission process according to the present invention.

Referring to FIG. 7, upon receipt of an ARQ status report in step 705, the ARQ transmitter determines in step 710 if an ARQ NACK for an average ARQ packet is included in the ARQ status report. The ARQ transmitter proceeds to step 720 if the ARQ NACK is included, and proceeds to step 715 if the ARQ NACK is not included.

In step 715, the ARQ transmitter performs a predetermined operation of, for example, discarding ACK ARQ packets in the ARQ status report.

In step 720, the ARQ transmitter checks the time the ARQ status report has occurred (hereafter referred to status report generation time). If a timestamp is included in the status report, the ARQ transmitter can set the value of the timestamp as the status report generation time. Alternatively, the ARQ transmitter can directly find the status report generation time, for example, can regard, as the status report generation time, the time a packet with the ARQ status report was first received at an HARQ receiver.

In step 725, the ARQ transmitter compares the retransmission time of ARQ NACK ARQ packets in the status report with the status report generation time. If the retransmission time is ahead of the status report generation time, the ARQ transmitter performs retransmission on the corresponding ARQ packets in step 735. However, if the retransmission complete time lags behind the status report generation time, the ARQ transmitter performs no retransmission on the corresponding ARQ packets in step 730.

Because retransmission of the HARQ packet by an HARQ processor is not completed yet, there is no retransmission complete time for the corresponding packet. Therefore, the ARQ transmitter performs no retransmission of the ARQ packet among the ARQ packets for which the retransmission complete time is ahead of the status report generation time. In addition, if an ARQ NACK for the ARQ packet, which has never been retransmitted before is included in the status report, the ARQ transmitter retransmits the corresponding ARQ packet.

Fourth Embodiment

Similarly, in a fourth embodiment of the present invention, an ARQ receiver attaches a status report generation time to a status report, and an ARQ transmitter determines whether to perform retransmission depending on the status report generation time. However, while the ARQ transmitter in the third embodiment stores the retransmission complete time of the ARQ packet only for the retransmission ARQ packet, the ARQ transmitter in the fourth embodiment stores a transmission complete time of all ARQ packets including the retransmission ARQ packet, and determines whether to perform retransmission by comparing the transmission complete time with the status report generation time.

If the ARQ transmitter stores the transmission complete time of all ARQ packets in this way, it can prevent not only the unnecessary retransmission of the already retransmitted ARQ packet but also the unnecessary retransmission due to packet disorder.

In the following description, the term 'ARQ Protocol Data Unit (PDU)' will be used instead of the term 'ARQ packet'. The PDU, a term frequently used in 3GPP, refers to a packet output from a specific protocol stack.

Figure 8:
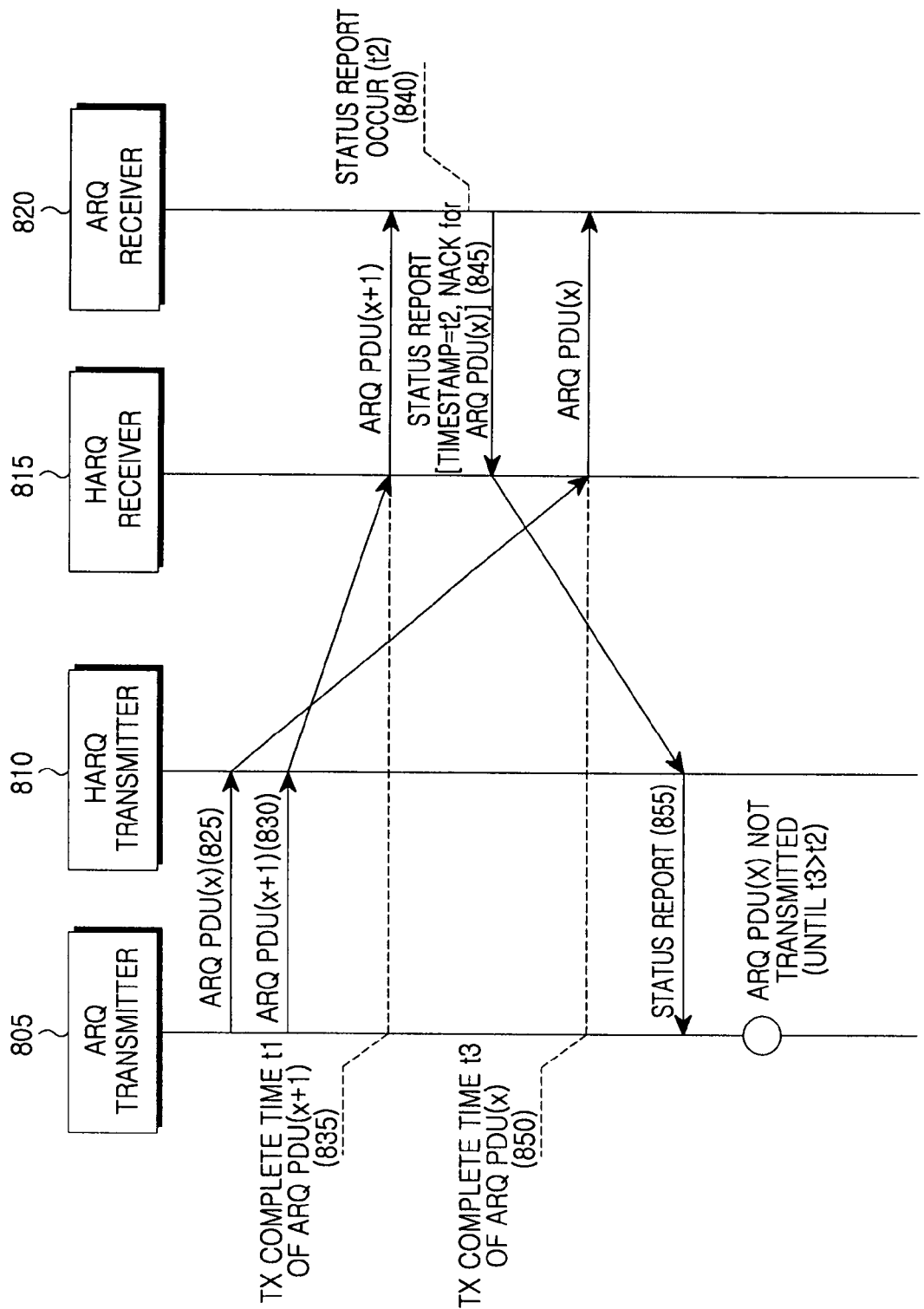
FIG. 8 is a flow diagram illustrating an ARQ transmission operation according to the present invention.

Referring to FIG. 8, an ARQ transmitter 805 transmits an ARQ PDU(x) at an arbitrary time in step 825, and thereafter transmits an ARQ PDU(x+1) at an arbitrary time in step 830. Herein, ARQ PDU(x) refers to an ARQ PDU with sequence number=x.

An HARQ packet with the ARQ PDU(x) and an HARQ packet with the ARQ PDU(x+1) are transmitted from an HARQ transmitter 810 to an HARQ receiver 815 through a specific HARQ process. The transmission complete time of the HARQ packet may be differently ordered from the generation time of the HARQ packet.

For example, if the HARQ packet with the ARQ PDU(x) succeeds in transmission after 5 HARQ retransmissions, and the HARQ packet with the ARQ PDU(x+1) succeeds in transmission after 2 HARQ retransmissions, a time t3 at step 850 indicating the transmission complete time of the ARQ PDU(x) will lag behind time t1 in step 835 indicating a transmission complete time of the ARQ PDU(x+1).

In other words, from the viewpoint of an ARQ receiver 820, the HARQ packet with the ARQ PDU(x+1) is received at time t1 in step 835 with 2 retransmissions, and the HARQ packet with the ARQ PDU(x) is received at time t3 in step 850 with 5 retransmissions.

If the status report occurs in ARQ receiver 820 at time t2 in step 840 indicating an arbitrary time between time t1 in step 835 and time t3 in step 850, the status report will contain a NACK for the ARQ PDU(x). That is, ARQ receiver 820 contains in the status report the NACK for the ARQ PDU(x) and time t2 indicating the status report generation time of the ARQ PDU(x), and sends the status report to ARQ transmitter 805 via HARQ receiver 815 and HARQ transmitter 810.

Therefore, ARQ transmitter 805 receives the NACK for the ARQ PDU(x) through the status report received in step 855, but time t2 in step 840 indicating the generation time of the status report with the NACK is ahead of time t3 in step 850 indicating the transmission complete time of the ARQ PDU(x), thereby performing scheduling to prevent retransmission of the ARQ PDU(x).

As shown in FIG. 8, the ARQ PDU(x) undergoes transmission disorder according to the number of retransmissions of the corresponding packet, and the ARQ receiver regards the corresponding packet as a missing PDU, thus unnecessarily generating a NACK. In this case, when the transmission complete time lags behind the status report generation time like in the fourth embodiment because the ARQ PDUs unnecessarily generate a NACK due to the disorder, the ARQ transmitter can compare the transmission complete time of the ARQ PDUs with the status report generation time, and schedule retransmission to prevent unnecessary retransmission due to the disorder.

In other words, even for the ARQ PDU with NACK included in the status report, if the transmission complete time of the ARQ PDU lags behind the generation time of the status report, there is a high possibility that the ARQ PDU would be successfully transmitted to the ARQ receiver after the status report occurs. Therefore, the ARQ transmitter performs scheduling to prevent the ARQ PDU from being retransmitted.

In the fourth embodiment of the present invention, after completing transmission of an average ARQ PDU, the ARQ transmitter memorizes the transmission complete time of the ARQ PDU. The transmission complete time of the ARQ PDU is the time the last transmission of the ARQ PDU is completed, and when the ARQ transmitter retransmits the ARQ PDU, it updates the transmission complete time with the time the retransmission of the ARQ PDU is completed. Upon receipt of the status report from the ARQ receiver, the ARQ transmitter discards the acknowledged (ACK-ed) ARQ PDUs in the status report and clears the transmission complete time of the ARQ PDUs.

However, the ARQ transmitter retransmits the ARQ PDUs for which the transmission complete time is ahead of the status report generation time, among the Non-Acknowledged (NACK-ed) ARQ PDUs in the status report, and does not retransmit the ARQ PDUs for which the transmission complete time lags behind the status report generation time.

That is, in the fourth embodiment of the present invention, the ARQ transmitter memorizes the transmission complete time of the ARQ packet that has succeeded in HARQ transmission. Upon receipt of the status report, the ARQ transmitter checks the status report generation time, and performs no retransmission on the NACK signal for the ARQ packets transmission-completed after the status report generation time, and performs retransmission on the NACK signal for the ARQ packets transmission-completed before the status report generation time.

Figure 9:
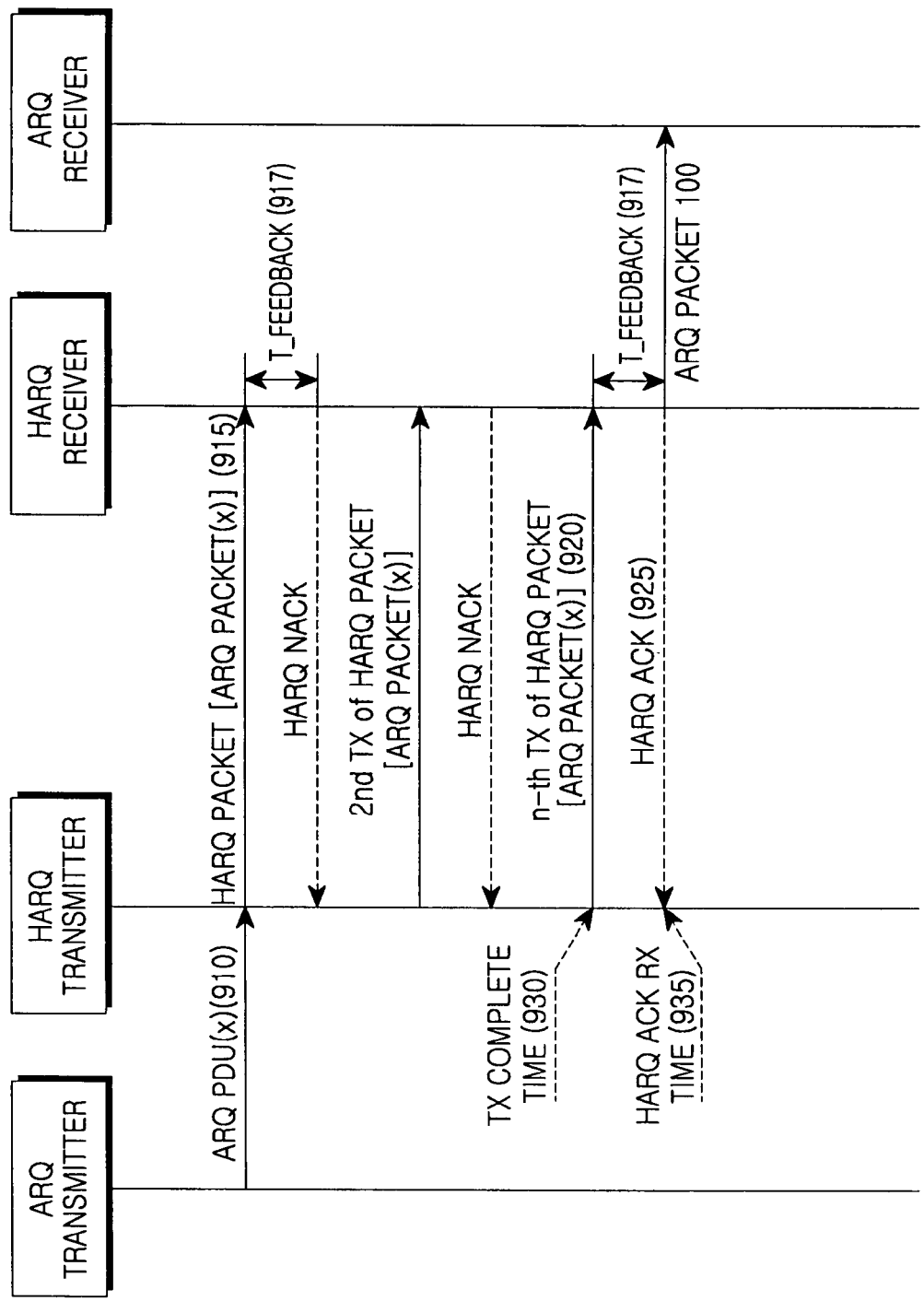
FIG. 9 is a flow diagram illustrating a process of calculating a transmission complete time according to the present invention.

In the operation shown in FIG. 9, an ARQ transmitter recognizes a transmission complete time of an ARQ PDU. The time the transmission of an average ARQ PDU is completed is the time the transmission of an HARQ packet with the ARQ PDU is completed.

Referring to FIG. 9, an ARQ PDU(x) is transmitted from an ARQ transmitter to an HARQ transmitter in step 910, and the HARQ transmitter inserts the ARQ PDU(x) in an arbitrary HARQ packet and transmits the HARQ packet to an HARQ receiver in step 915. At this point, the HARQ transmitter retransmits the ARQ PDU(x) according to an HARQ NACK signal sent from the HARQ receiver.

In step 920, the HARQ packet is successfully transmitted to the HARQ receiver through an $n^{th}$ transmission process. The HARQ receiver soft-combines an $n^{th}$-transmitted HARQ PDU in step 920 with the previously received HARQ PDU, and then checks the presence/absence of any error in the combined HARQ PDU. In the absence of the error, the HARQ receiver sends an HARQ ACK signal to the HARQ transmitter in step 925.

Therefore, the time the HARQ transmitter recognizes that the transmission of an arbitrary HARQ packet is successfully completed, is the time in step 935 the HARQ transmitter has received the HARQ ACK for the packet from the HARQ receiver. However, the transmission complete time in step 930 indicating the actual time the HARQ packet is successfully transmitted, is ahead of the time in step 935 the HARQ transmitter has received the HARQ ACK. The specific time difference between the reception times is referred to as T_feedback 917. As the arbitrary HARQ packet and its associated feedback information have a time difference relationship, there is no need to separately specify with which HARQ packet the feedback information is associated.

Therefore, the transmission complete time of the arbitrary HARQ packet can be expressed as Equation (1).

$$\text{HARQ packet transmission complete time} = \text{'HARQ ACK reception time for HARQ packet'} - \text{T\_feedback} \quad (1)$$

Therefore, after completing transmission of the HARQ packet, the HARQ transmitter reports the HARQ packet transmission complete time to the ARQ transmitter, and the ARQ transmitter updates the ARQ PDU transmission complete time using the transmission complete time of the HARQ packet. The transmission complete time of the ARQ PDU(x) is the transmission complete time of an HARQ packet with the ARQ PDU(x).

The transmission operation of FIG. 9 can be applied even when the ARQ transmitter in the third embodiment of the present invention recognizes the retransmission complete time of an ARQ PDU.

Figure 10:
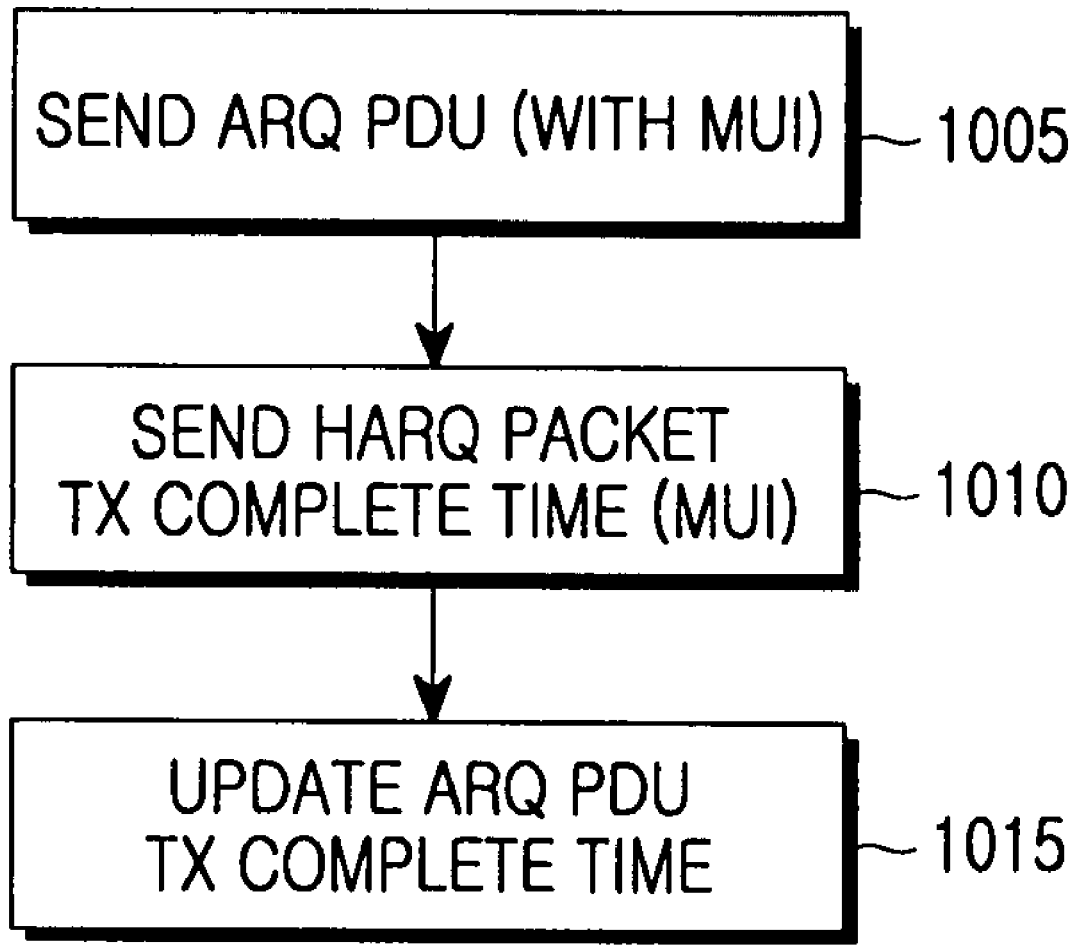
FIG. 10 is a flow chart illustrating an ARQ transmitter's operation of managing an ARQ PDU transmission complete time according to the present invention.

Referring to FIG. 10, an ARQ transmitter delivers an ARQ PDU to a lower layer in step 1005. At this point, the ARQ transmitter transmits a Message Unit Identifier (MUI), which is a temporary identifier for the ARQ PDU, together with the ARQ PDU.

In step 1010, the lower layer contains the ARQ PDU in an HARQ packet, and transmits the HARQ packet through a specific HARQ process. If transmission of the HARQ packet is completed, the lower layer delivers the transmission complete time of the HARQ packet and the MUI of the ARQ contained in the HARQ packet, to the ARQ transmitter.

In step 1015, the ARQ transmitter updates the ARQ PDU transmission complete time of the corresponding ARQ PDU with the HARQ packet transmission complete time using the MUI.

Figure 11:
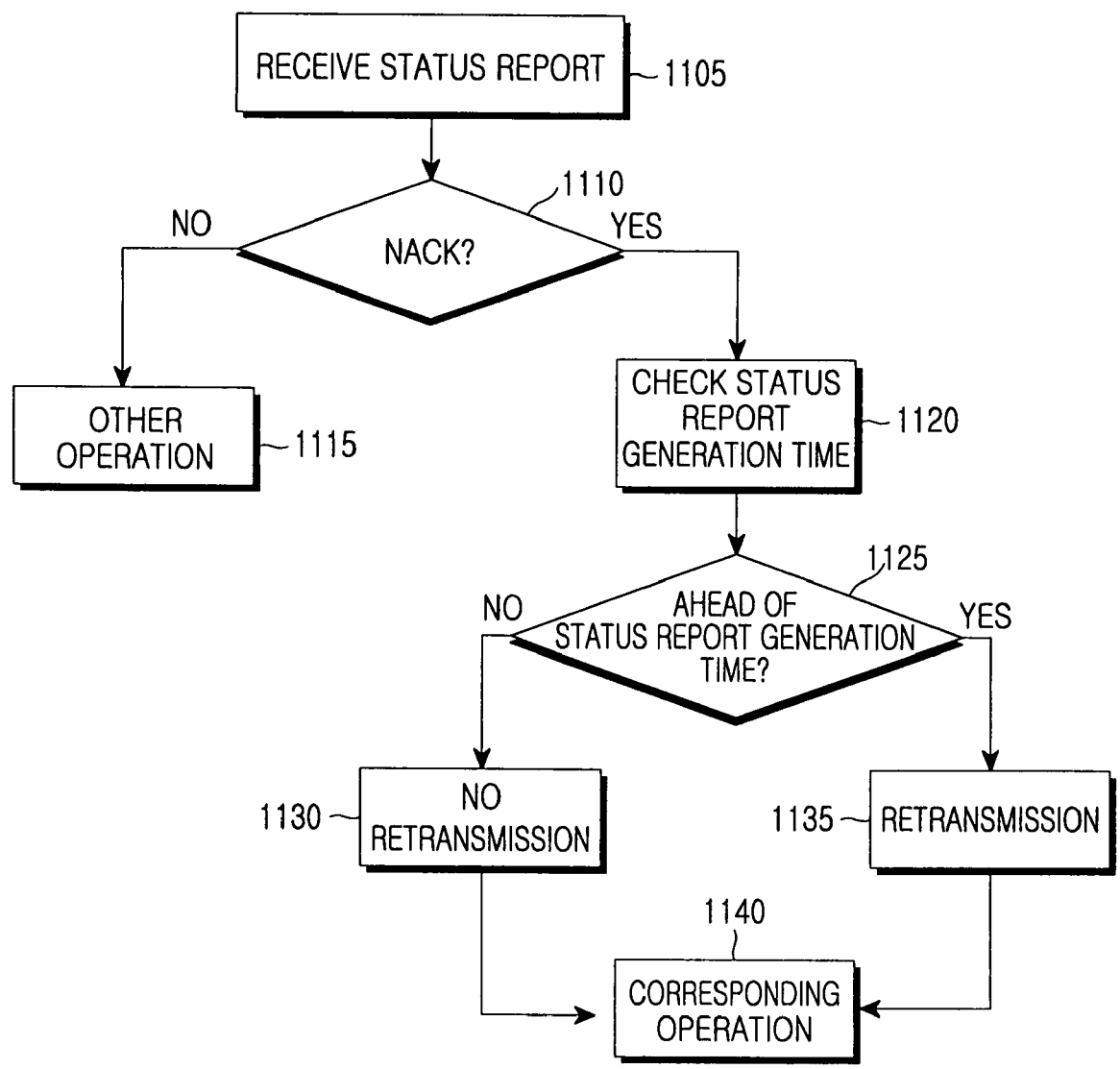
FIG. 11 is a flow chart illustrating an operation of an ARQ transmitter receiving a status report according to the fourth embodiment of the present invention.

Referring to FIG. 11, upon receiving an ARQ status report in step 1105, an ARQ transmitter determines in step 1110 whether an ARQ NACK is included in the status report. The ARQ transmitter proceeds to step 1120 if the ARQ NACK is included, and proceeds to step 1115 if the ARQ NACK is not included. In step 1115, the ARQ transmitter performs an operation of, for example, discarding the Acknowledged (ACK-ed) ARQ packets in the ARQ status report, and clears the transmission complete time of the corresponding ARQ packets.

However, in step 1120, the ARQ transmitter checks the status report generation time included in the status report. The status report generation time, the time the status report has occurred, is defined herein as a timestamp. Alternatively, the ARQ transmitter can regard, as the status report generation time, the time the packet with the status report is first received at an HARQ receiver.

In step 1125, the ARQ transmitter compares the transmission complete time of the Non-Acknowledged (NACK-ed) ARQ PDUs in the status report with the status report generation time. As a result of the comparison, if the ARQ PDU transmission complete time is ahead of the status report generation time, the ARQ transmitter performs retransmission on the corresponding ARQ PDUs in step 1135. However, if the ARQ PDU transmission complete time lags behind the status report generation time, the ARQ transmitter performs no retransmission on the corresponding ARQ PDUs in step 1130.

Because the currently transmitted/retransmitted ARQ PDU in an HARQ processor, among the ARQ PDUs for which the ARQ PDU transmission complete time is ahead of the status report generation time, is a packet whose transmission is not completed yet, there is no transmission complete time. Therefore, such ARQ packets also undergo no retransmission.

A further description will now be made of the 'time' used throughout the specification.

In the present invention, a plurality of times that should be recognized by a terminal (or UE) and a base station (or Node B) in the same way, such as 'status report generation time' and 'transmission complete time', is used. The simplest method for allowing an index indicating an arbitrary time to have the same meaning between two entities can be implemented such that the terminal and the base station have synchronized timers. However, in the common mobile communication, it is the general practice to use the time broadcasted by the base station rather than using the independent synchronized timers.

Commonly, the mobile communication uses a so-called frame as a time unit. The frame means a period used as a basic transmission/reception unit, and for example, in UMTS, one frame is 10 msec.

In the conventional UMTS mobile communication system, a base station has a timer (or counter) that increases by 1 at every a frame boundary. That is, the timer increases by 1 every 10 msec, and the timer starts when an arbitrary frame starts. The value that increases by 1 every frame boundary is called a frame number of the corresponding frame, and as the base station periodically broadcasts the frame number, the terminal and the base station can recognize the time to which a particular frame belongs.

The 'time' used through the specification can be replaced with the frame number broadcasted by the base station. For example, the status report generation time is replaceable with a frame number of the frame for which a status report has occurred, and the transmission complete time is replaceable with a frame number of the transmission-completed frame.

The frame number may have a hierarchical structure. For example, in LTE, because the transmission/reception unit is a short period of 0.5 msec, the terminal and base station use a period longer than the 10-msec transmission/reception unit as a unit of the frame, rather than recognizing the frame every 0.5 msec, and can use the 0.5-msec period as a unit of a sub-frame.

That is, the system, in which one frame having a 10-msec length is composed of 20 sub-frames having a 0.5-msec length, can use a combination of a frame number and a sub-frame number as an index of the time. For example, '2505.11' means a sub-frame #11 in a frame #2505.

Figure 12:
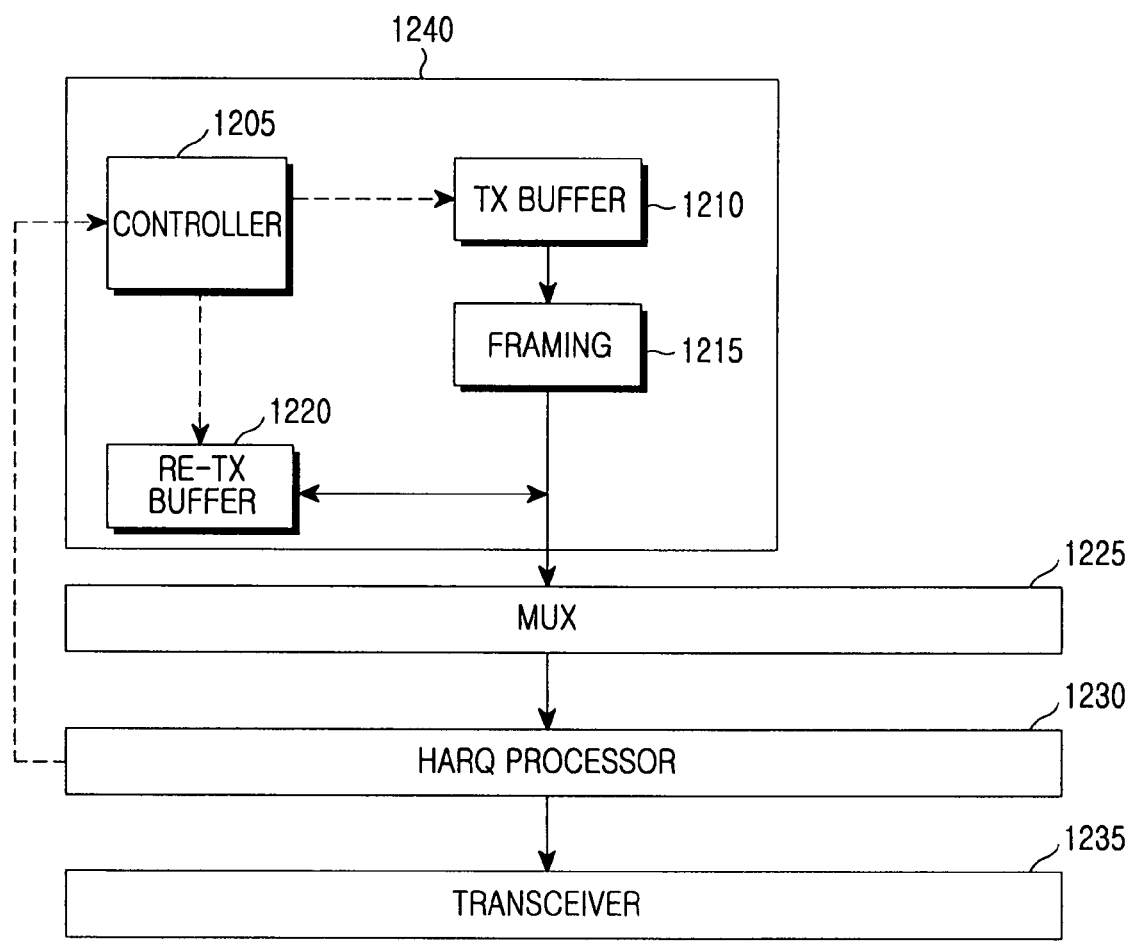
FIG. 12 is a diagram illustrating the structure of an ARQ transmission apparatus to which the present invention is applicable.

Referring to FIG. 12, an ARQ transmission apparatus 1240 includes a controller 1205, a transmission buffer 1210, a framing unit 1215, and a retransmission buffer 1220.

The ARQ transmission apparatus 1240 is connected to a multiplexer 1225, and the multiplexer 1225 multiplexes a plurality of ARQ packets delivered from a plurality of ARQ transmission apparatuses into one HARQ packet. An HARQ processor 1230 is a device for transmitting an HARQ packet through a specific HARQ operation. A transceiver 1235 is a device for modulating the HARQ packet into a radio signal before transmission, and demodulating a received radio signal.

ARQ transmission apparatus 1240 receives the packets generated in an upper layer and stores them in transmission buffer 1210. Framing unit 1215 performs framing by disassembling/concatenating/assembling an upper layer packet read from transmission buffer 1210 in an appropriate size. The framed packet is formed into an ARQ packet in which header information including a sequence number is inserted, and then delivered to multiplexer 1225. A copy of the ARQ packet is stored in retransmission buffer 1220. Controller 1205 controls retransmission of the ARQ packet depending on a local NACK received from HARQ processor 1230, and/or an ARQ NACK received from an ARQ receiver (not shown).

An operation of controller 1205 can be different according to foregoing embodiments of the present invention.

For example, according to the first embodiment of the present invention, controller 1205 manages VT(DIFF) for each ARQ packet, and performs retransmission on an ARQ packet, for which a local NACK is received or VT(DIFF) is greater than '0'.

According to the second embodiment of the present invention, controller 1205 manages N(local NACK 1), N(local NACK 2) and N(ARQ NACK) for each ARQ packet, and performs retransmission on an ARQ packet, for which a local NACK type #1 is received. If a local NACK type #2 is received, controller 1205 performs retransmission on an ARQ packet for which N(local NACK 2)>N(local NACK 1). If an ARQ NACK is received, controller 1205 performs retransmission on an ARQ packet for which N(ARQ NACK)>N (local NACK 2).

According to the third embodiment of the present invention, controller 1205 memorizes the retransmission complete time for each ARQ packet, and upon receipt of a status report, compares the retransmission complete time with the status report generation time to determine whether to perform retransmission on the corresponding ARQ packet.

According to the fourth embodiment of the present invention, controller 1205 memorizes the transmission complete time for each ARQ PDU, and upon receipt of the status report, compares the transmission complete time with the status report generation time to determine whether to perform retransmission on the corresponding ARQ packet.

As can be understood from the foregoing description, in the system where HARQ and ARQ operate together, the ARQ transmitter performs retransmission scheduling using the reliability-guaranteed HARQ NACK and ARQ NACK, thereby contributing to an increase in efficiency of the limited resources. In addition, the ARQ transmitter performs retransmission scheduling carefully, thereby reducing the entire load of the system for processing both ARQ and HARQ.

While the invention has been shown and described with reference to a certain preferred embodiment thereof, it will be understood by those skilled in the art that various changes in form and details may be made therein without departing from the spirit and scope of the invention as further defined by the appended claims.

What is claimed is:

1. A method for performing Automatic Retransmission reQuest (ARQ) on a packet data in a mobile communication system, the method comprising:
receiving from a transmission entity performing ARQ, by a reception entity, a status report message including a Non-Acknowledged (NACK) signal for the packet data transmitted to the reception entity, and generation time information of the NACK signal;
comparing, by the transmission entity, the generation time information with transmission complete time information for the packet data; and
determining whether to retransmit the packet data depending on the comparison result, and retransmitting the packet data according to the determination step.

2. The method of claim 1, wherein retransmission of the packet data comprises:
retransmitting the packet data when the generation time lags behind the transmission complete time.

3. The method of claim 2, further comprising:
performing no retransmission of the packet data if Hybrid Automatic Retransmission reQuest (HARQ) for the packet data is being performed when the generation time lags behind the transmission complete time.

4. The method of claim 1, wherein the transmission complete time information indicates a time the last transmission, including retransmission, of the packet data is completed.

5. The method of claim 1, wherein the transmission complete time is a value determined by subtracting the time required until receiving a response signal after transmitting packet data, from a time at which an Acknowledged (ACK) signal for the packet data is received from the reception entity.

6. An apparatus for performing Automatic Retransmission reQuest (ARQ) on packet data in a mobile communication system, the apparatus comprising:
- a transmission buffer for storing packet data generated in an upper layer;
- a framing unit for framing the transmission packet data in an appropriate size and inserting a header therein;
- a retransmission buffer for temporarily storing the packet data delivered from the framing unit;
- a Hybrid Automatic Retransmission reQuest (HARQ) device for reconfiguring and transmitting the framed packet data in an HARQ unit, and soft-combining an HARQ response signal transmitted from a receiver with a response signal for transmission-completed HARQ packet data to generate a Non-Acknowledged (NACK) signal for requesting retransmission of the packets; and
- a controller for controlling the retransmission buffer and the transmission buffer taking into account the NACK signal delivered from the HARQ device and the HARQ response signal received from the receiver;

wherein the controller compares a generation time of the NACK signal for the packet data with a transmission complete time for the packet data, and determines whether to retransmit the packet data according to the comparison result.

7. The apparatus of claim 6, wherein the controller determines to retransmit the packet data when the generation time lags behind the transmission complete time.

8. The apparatus of claim 7, wherein when the generation time lags behind the transmission complete time, the controller determines to perform no retransmission on the packet data if Hybrid Automatic Retransmission reQuest (HARQ) for the packet data is being performed.

9. The apparatus of claim 6, wherein the transmission complete time information indicates a time the last transmission, including retransmission, of the packet data is completed.

10. The apparatus of claim 6, wherein the transmission complete time is a number determined by subtracting the time required until receiving a response signal after transmitting packet data, from the time at which an Acknowledged (ACK) signal for the packet data is received from the receiver.

* * * * *